United States Patent
Steimel et al.

(10) Patent No.: US 7,290,967 B2
(45) Date of Patent: Nov. 6, 2007

(54) DUST EXTRACTOR DEVICE FOR A ROUTER

(75) Inventors: Johannes Steimel, Neidlingen (DE); Bernhard Manz, Leinfelden (DE); Markus Stark, Neidlingen (DE); Arne Holtz, Köngen (DE)

(73) Assignee: Festool GmbH, Wendlingen (DE)

( * ) Notice: Subject to any disclaimer, the term of this patent is extended or adjusted under 35 U.S.C. 154(b) by 458 days.

(21) Appl. No.: 10/951,376

(22) Filed: Sep. 28, 2004

(65) Prior Publication Data

US 2005/0180828 A1 Aug. 18, 2005

(30) Foreign Application Priority Data

Feb. 13, 2004 (EP) ................... 04003215

(51) Int. Cl.
*B23C 1/20* (2006.01)

(52) U.S. Cl. .................... 409/137; 409/182; 144/252.1

(58) Field of Classification Search ........ 409/137–138, 409/182, 180, 175, 178; 408/67; 144/252.1, 144/136.95, 154.5; *B23C 1/20; B23Q 11/02, B23Q 11/00*
See application file for complete search history.

(56) References Cited

U.S. PATENT DOCUMENTS

| | | | | |
|---|---|---|---|---|
| 4,409,699 A | * | 10/1983 | Moorhouse | 15/415.1 |
| 4,613,261 A | * | 9/1986 | Maier et al. | 409/137 |
| 4,674,548 A | * | 6/1987 | Mills et al. | 144/154.5 |
| 4,750,536 A | * | 6/1988 | Grisley | 144/251.3 |
| 4,792,266 A | * | 12/1988 | Willis | 409/182 |
| RE33,045 E | * | 9/1989 | Gronholz et al. | 144/154.5 |
| 5,509,454 A | * | 4/1996 | Giacometti | 144/252.1 |
| 5,993,124 A | * | 11/1999 | Cooper et al. | 409/137 |
| 6,796,755 B2 | * | 9/2004 | Angeloni | 409/182 |
| 2002/0182023 A1 | | 12/2002 | Lai et al. | |
| 2004/0076485 A1 | | 4/2004 | Kraus | |

FOREIGN PATENT DOCUMENTS

| | | |
|---|---|---|
| DE | G 86 09 919.1 | 6/1986 |
| DE | 4019331 A1 * | 10/1990 |
| DE | 4407081 A1 * | 9/1994 |
| DE | 202 16 066 | 12/2002 |
| DE | 102 23 893 | 12/2003 |

* cited by examiner

*Primary Examiner*—Daniel W. Howell
(74) *Attorney, Agent, or Firm*—Flynn, Thiel, Boutell & Tanis, P.C.

(57) ABSTRACT

A dust extractor device of a router has rotatable dust trap part able to be connected with a foot plate of the router and arranged to the side of the routing tool underneath the foot plate, such dust trap part being open toward the routing tool. The foot plate has an access opening for the routing tool. The dust trap part is constituted by an extractor hood with a hood casing at least essentially centered on the axis of rotation and a hood floor. The hood casing and the hood floor extend in the peripheral direction through an angle equal to or less than 180°. The extractor hood is open at its top side and opens into the access opening. The top end region of the extractor hood is rotatably supported on a holder, which is detachably secured to the foot plate and in the position of use extends around the access opening. The top side of the access opening is provided with a covering means, which is detachably attached to the foot plate and covers the access opening, such covering means having in it an access opening for the routing tool. The connection means is, in the position of use, in open connection with the access opening.

11 Claims, 4 Drawing Sheets

Fig. 3
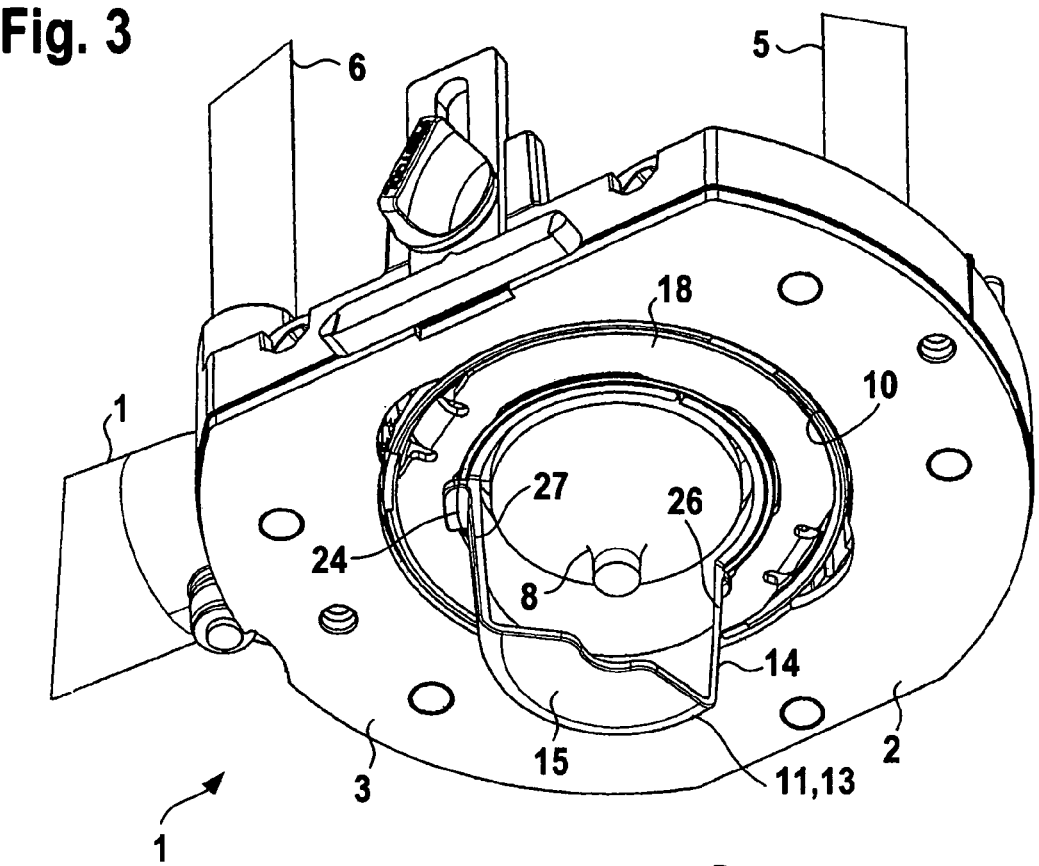
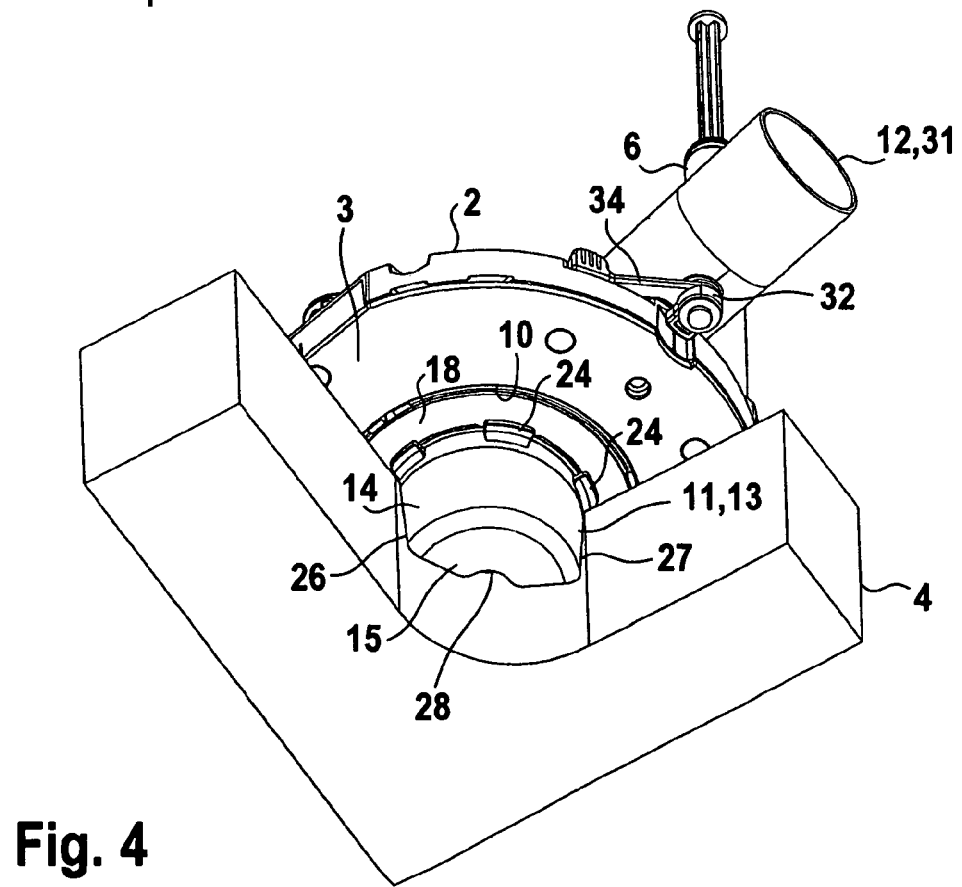
Fig. 4

DUST EXTRACTOR DEVICE FOR A ROUTER

BACKGROUND OF THE INVENTION

The invention relates to a dust extractor device for a router in the case of which the router possesses a foot plate, to be placed on the work to be routed, having an access opening for the passage of a routing tool, such tool being adapted to be connected with the drive shaft of a router drive unit arranged in a vertically adjustable fashion above the foot plate and able to be caused to perform a rotary movement, comprising a dust trap part adapted to be releaseably secured to the foot plate, such dust trap part being arranged to the side of the routing tool in its position of use and being open toward the routing tool able to be turned about the axis of rotation so that during operation the router dust or the like entering the dust trap part is aspirated into an extractor connection means.

THE PRIOR ART

In the case of a dust extractor device disclosed in the German patent publication 20,216,066.1 (utility model) the dust trap part has a funnel-like shape and is so connected with an annular duct surrounding the foot plate that the dust trap part may be shifted along the annular duct and hence around the routing tool. The router dust or the like is able to pass into the annular duct in any desired angular position of the dust trap part, such annular duct carrying the connection means for the suction hose.

The funnel-like dust trap part is comparatively far removed from the routing tool. Furthermore, its opening turned toward the routing tool has a comparatively small cross section. Accordingly during routing work a comparatively large amount of router dust makes its way past the dust trap part and escapes into the surroundings.

The known dust extractor device is furthermore comparatively bulky and is high in price.

SHORT SUMMARY OF THE INVENTION

Accordingly one object of the present invention is to provide a dust extractor device with maximum effectiveness as regards the aspiration or extraction of dust.

A further object of the invention is to provide such a dust extractor device requiring comparatively little space and whose design is as simple as possible.

In order to achieve these and/or other objects appearing from the present specification, claims and drawings, in the present invention the dust trap part is constituted by an extractor hood which possesses a hood casing arranged to be at least substantially centered on the axis of rotation in the position of use, and furthermore a hood floor facing away from the foot plate in the position of use, the hood casing and the hood floor extending through an angle equal to or less than 180° in the peripheral direction, the extractor hood is open at its top side and opens into the access opening in the position of use, the top end region of the extractor hood is rotatably supported on a holder able to be attached releaseably to the foot plate and in the position of use extending about the access opening, the top side of the access opening is provided with a covering means covering the access opening in the position of use and able to be detachably connected with the foot plate, such covering means having a passage aperture for the routing tool, and in the position of use the connection means being in an open connection with the access opening.

It is in this manner that the aspiration or extraction of dust takes place through the central access opening in the foot plate so that, possibly with the exception of the connection means, a space saving arrangement is possible without parts projecting past the foot plate. The top covering means prevents escape of router dust or the like upward so that the router dust is reliably passed to the connection means and thence into the aspiration hose. It is a question here of simple and economic components.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

FIG. 3 shows the arrangement of FIGS. 1 and 2 without the workpiece as viewed obliquely from below.

FIG. 4 is an oblique view corresponding to FIG. 3 looking upward together with a workpiece to be routed.

Figure 8:
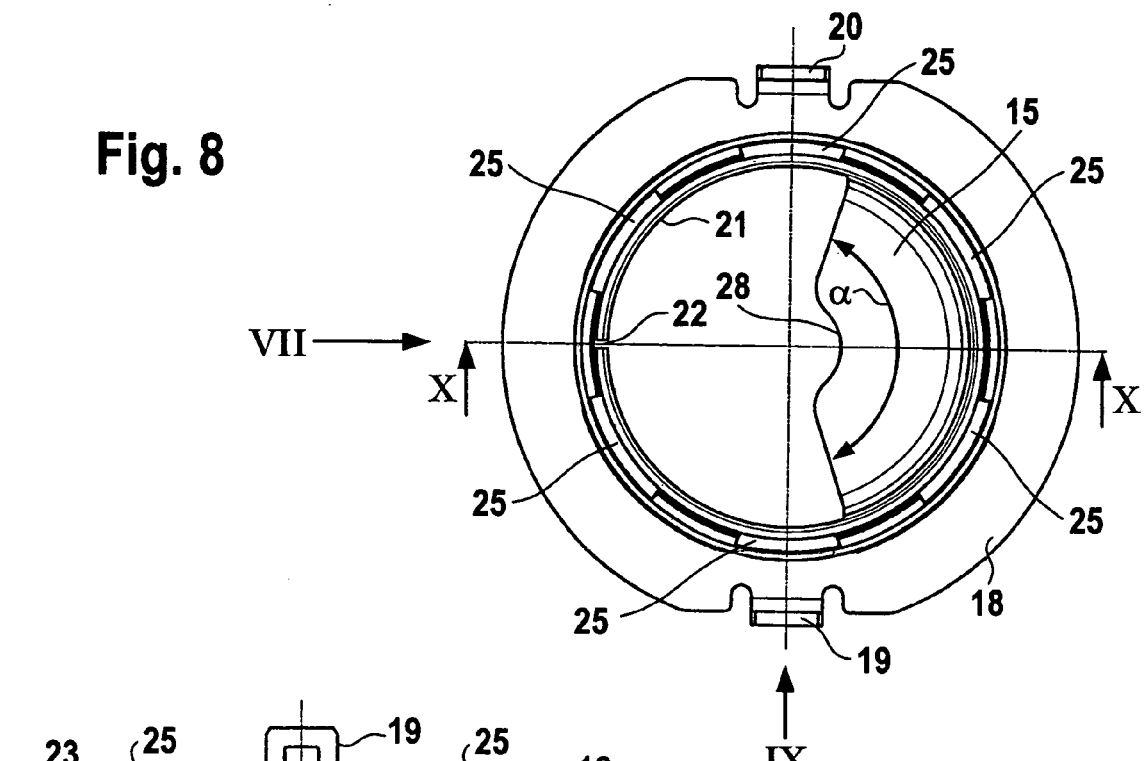
FIG. 8 shows the arrangement of FIGS. 5 through 7 in a plan view.
Figure 9:
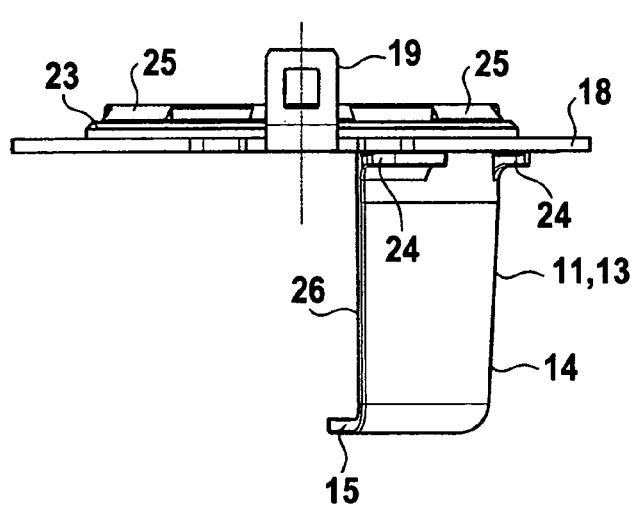
FIG. 9 shows the arrangement of FIGS. 5 through 8 in a side elevation looking in the direction of the arrow IX in FIG. 8.
Figure 10:
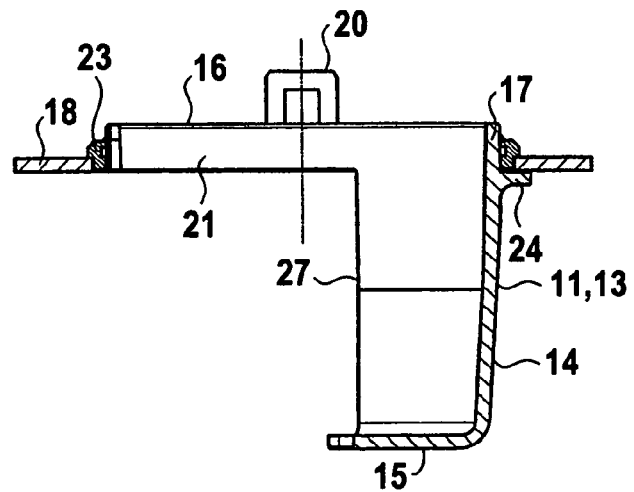

FIG. 10 again shows the same arrangement in a section, taken on the line X-X of FIG. 8, parallel to the side view of FIG. 9

DETAILED ACCOUNT OF WORKING EMBODIMENTS OF THE INVENTION

Figure 1:
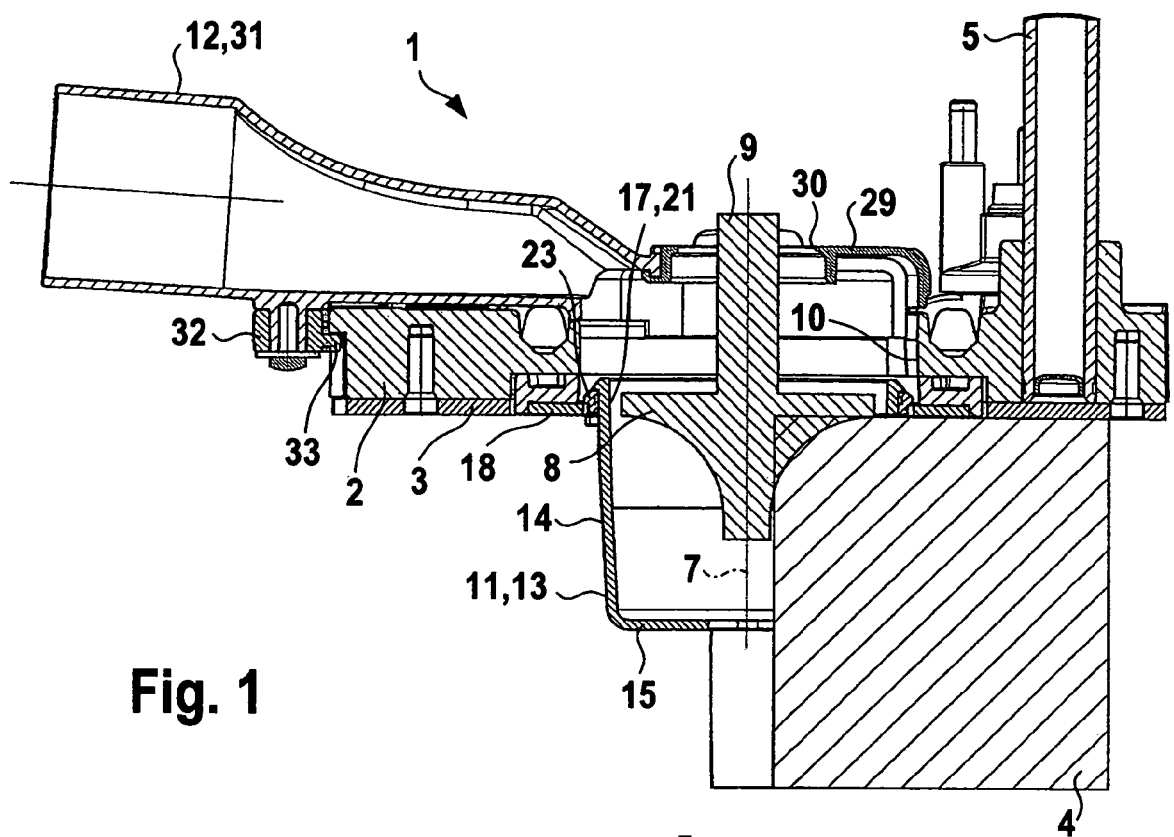
FIG. 1 shows the region of the foot plate of a router with an attached dust extractor device during routing a workpiece in a section taken on the line I-I of FIG. 2.
Figure 2:
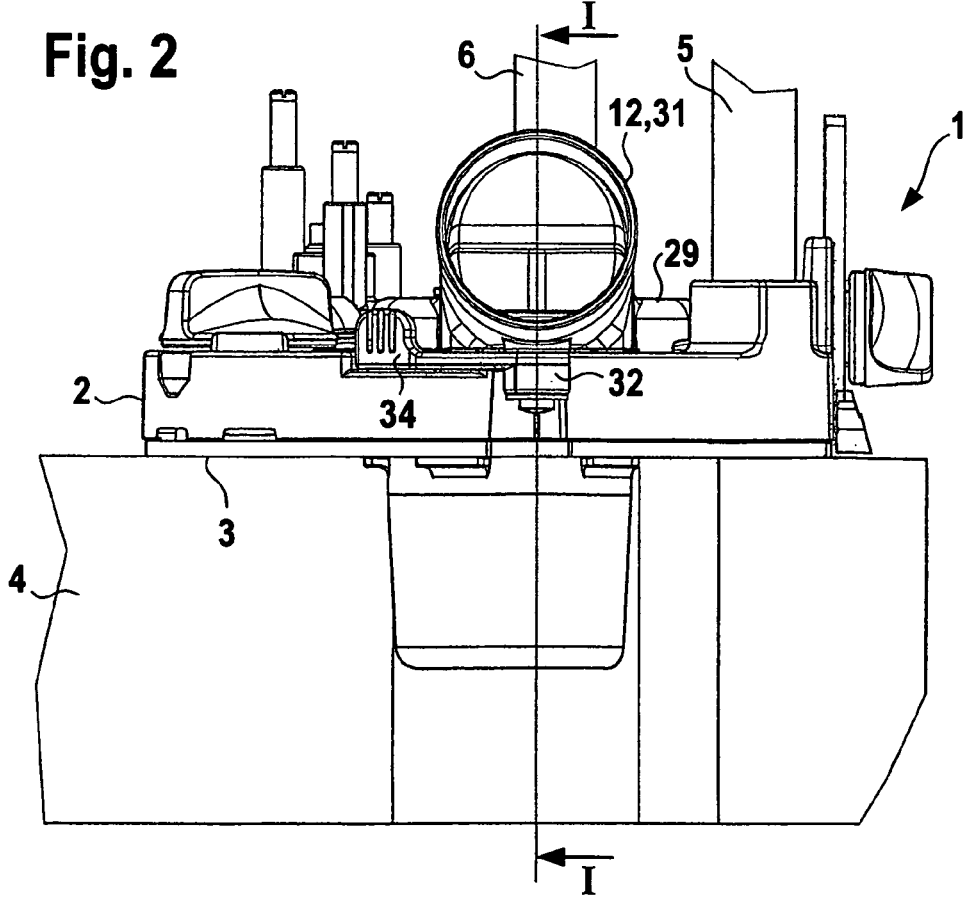
FIG. 2 shows the arrangement of FIG. 1 as seen from the left from the side.
Figure 5:
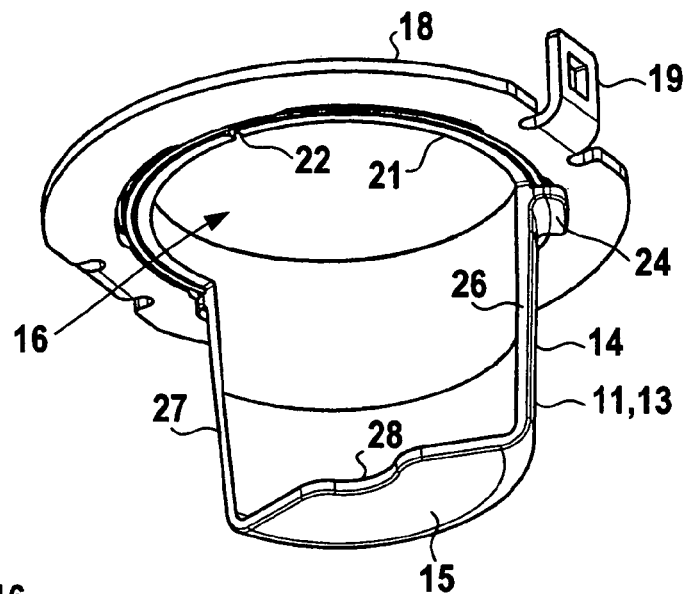
FIG. 5 shows the extractor hood and associated holder in a separate representation looking obliquely upward.
Figure 6:
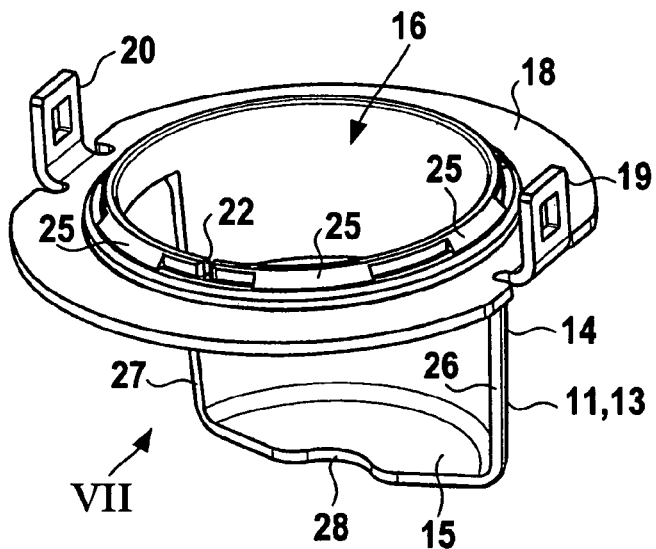
FIG. 6 shows the arrangement of FIG. 5 in an oblique view from above.
Figure 7:
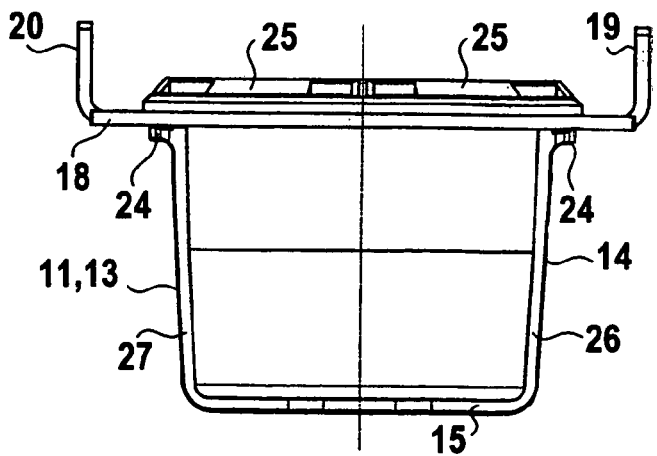
FIG. 7 shows the arrangement in accordance with FIGS. 5 and 6 in a side view as indicated by the arrow VII in FIGS. 6 and 8.

A router has a table unit 1 with a foot plate 2, whose bottom side 3 is held engaged on a workpiece 4 to be routed. Two support columns 5 and 6, which are spaced apart, extend upward from the foot plate, to carry a drive unit, not illustrated able to be moved along the support columns 5 and 6. The drive unit comprises a drive motor, a transmission and a chuck for a routing tool 8 extending in an axial direction 7 (which is parallel to the support columns 5 and 6), the shank of the routing tool 8 being secured in the chuck so that it is connected with the output shaft of the drive unit and in operation the routing tool 8 performs a rotary movement about the axis 7. The routing tool 8 is represented in FIG. 1 without the chuck of the drive unit. The routing tool 8 extends through the central access opening 10 in the foot plate 2 and may be shifted into a position projecting downward from the foot plate 2 by sliding the drive unit along the support columns 5 and 6, in which position it engages a workpiece 4 with the router tool. If the router is moved over the workpiece 4 it will be cut during the movement.

The material removed by routing, in the following named sawdust, is drawn off to keep the surroundings clean. For this purpose use is made of a dust extractor device having a dust trap part 11 able to be attached in a detachable manner to the foot plate 2. The dust trap part 11 is arranged in its position of use, represented in FIGS. 1 through 4, underneath the foot plate 2 to the side of the routing tool 8 and its side facing the routing tool 8 is open. The dust produced during routing is caught during operation in the dust trap part 11 and thence drawn into an aspiration connection means 12, with which an aspiration hose leading to a vacuum cleaner may be connected, The dust trap part 11 is constituted by a extractor hood 13, which comprises a hood casing 14, which in the position of use is at least essentially centered on the axis 7 of rotation and a hood floor 15 facing away from the foot plate in the position of use. The extractor hood 13 projects, in its position of use, downward from the foot plate 2. The hood casing 14 and the hood floor 15 extend in the peripheral direction through an angle equal to or less than 180° s and preferably an angle in a range between approximately 130 and 160° and more especially between 140° and 150°. In the case represented the angle a of extent measured in the peripheral direction is equal to approximately 145°. The extractor hood 13 accordingly surrounds the routing tool 8 merely for a part of its periphery so that the part thereof which is not surrounded by the extractor hood 13 can engage the workpiece 4.

The extractor hood 13 is open at the top side 16 and in this respect so arranged in the position of use that it opens in the access opening 10, i.e. the interior of the extractor hood 3 terminates at the bottom at the access opening 10.

The extractor hood 13 is able to be turned around the axis 7 of rotation. For this purpose the top end region 17 of the extractor hood 13 is supported in a rotatable fashion on a holder 18, which is detachably joined to the foot plate, there preferably being a provision such that the holder 18 is, in the attached state, arranged on the bottom side 3 of the foot plate 2. The holder, which in the attached state is arranged on the foot plate and not able to turn, may joined with the foot plate, for example in a detachable manner by detent means. For this purpose in the working embodiment two holding lugs 19 and 20 extend upward from the holder 18, which are plugged into the foot plate 2, which is suitably designed at these points. Fitting into position may be by hand, for example by thrusting against suitable actuating members.

It is possible to have the same detent connection as described in the German patent publication 10,223,893 A1 for a copying ring.

At its top end region 17 the extractor hood 13 preferably has a neck part 21 surrounding it in the peripheral direction, by means of which the extractor hood 13 is be rotatably carried on the holder 18. The neck part 21 can be slotted for assembly purposes (slot 22) so that the neck part 21 may be squeezed together somewhat. Free rotation is made possible using a race ring 23, same being arranged between the neck part 21 of the extractor hood 13 and the hood floor 18.

At the top the extractor hood 13 possesses abutment projections 24 extending from its hood casing 14 to the outside and which engages the race ring 23 and the holder 18 from below. Furthermore a plurality of detent spurs 25, projecting at the top side of the neck part 21, are distributed about the periphery, such spurs protruding to the outside and in the mounted state fitting over the race ring 24. Instead of the distributed detent spurs 25 a single detent spur extending right the way round could be provided.

During assembly the neck part 21 is inserted through the holder 18, the neck part 21 being somewhat compressed until the detent spurs 25 are plugged in. The neck part 21 springs open again so that the detent spurs 25 fit over the holder 18, which for its part fits over the holder 18 at a step.

Once the holder 18 together with the extractor hood 13 has been secured to the bottom side of the foot plate 2 around the access opening 10, the extractor hood 1 13 may be turned around the routing tool 8. The result of this is that the angular position of the extractor hood is automatically adapted to the form of the workpiece surface to be routed during routing. As already mentioned the hood casing 14 and the hood floor 15, may as in the working example, extend over a smaller angle than 180°. This is particularly an advantage when an arris in the workpiece is to be routed (see FIG. 4). The radius of the arris must be larger than a minimum radius, which is dependent on the angle of extent of the hood casing 14 and the hood floor 15 in the peripheral direction. The smaller this angle, the smaller may be the radiuses of the arrises of the workpiece.

The automatic turning of the extractor hood 13 is due to the fact that the edge 26 and 27, which is leading in the direction of rotation of the router, of the hood casing 14 abuts with the workpiece face to be routed.

The hood floor 15, has, as may be seen more especially from FIG. 8, a configuration which is preferably in the form of a circular sector having a central bay 28. The shape of such bay 28 is preferably that of a circular sector. Such bay 28 is provided for a case in which a ball bearinged roller abutment is secured to the routing tool 8. Owing to the bay 28 in the hood floor 15 a space is provided for the attachment means, with which the roller abutment can be secured to the routing tool 8.

The sawdust is, as already mentioned, aspirated and removed by way of the access opening 10 in the foot plate 2 to the connection means 12. This flow path is be terminated on the outside. Accordingly the top side of the access opening 10 is provided with a covering means 29, same being detachably connected with the foot plate 2 and covering the access opening 10 in the position of use. The covering means 29 may have a hood-like or cover-like shape. It has an access opening 30 for the routing tool 8 also for its shank 9.

The connection means 12, which in the working embodiment illustrated is constituted by a connection spigot 31, can also be detachably connected with the foot plate 2. In this case the connection means 12 is preferably arranged in the position of use on the top side of the foot plate 2. The connection means 12 is best permanently or detachably connected with the covering means 29.

It is in this manner that during non-use the covering means 29 may be taken off together with the connection means 12.

The joining of the covering means 29 to the connection means 12 may for example be by hook or catch means. For this purpose a rotatably mounted rotary member 32 can be arranged on the bottom side of the connection means 12, which by operation of a lever member 34 is rotated and has a detent projection 33 fitting underneath the foot plate 2 in the connected state with the foot plate (see FIG. 1).

The invention claimed is:

1. A dust extractor device for a router in the case of which the router possesses a foot plate, to be placed on the work to be routed, having an access opening for the passage of a routing tool, such tool being adapted to be connected with the drive shaft of a router drive unit arranged in a vertically adjustable fashion above the foot plate and able to be caused to perform a rotary movement, comprising a dust trap part adapted to be releaseably secured to the foot plate, such dust trap part being arranged to the side of the routing tool in its position of use and being open toward the routing tool and able to be turned about the axis of rotation so that during operation the router dust or the like entering the dust trap part is aspirated into an extractor connection means, wherein the dust trap part is constituted by an extractor hood which possesses a hood casing arranged to be at least substantially centered on the axis of rotation in the position of use, and furthermore a hood floor facing away from the foot plate in the position of use, the hood casing and the hood floor extending through an angle equal to or less than 180° in the peripheral direction, the extractor hood is open at its top side and opens into the access opening in the position of use, the top end region of the extractor hood is rotatably supported on a holder able to be attached releaseably to the foot plate and in the position of use extending about the access opening, the top side of the access opening is provided with a covering means covering the access opening in the position of use and able to be detachably connected with the foot plate, such covering means having a passage aperture for the routing tool, and in the position of use the connection means being in an open connection with the access opening.

2. The dust extractor device as set forth in claim 1 wherein the hood casing and the hood floor extend in the peripheral direction through an angle in a range of approximately 130° to 160°.

3. The dust extractor device as set forth in claim 1 wherein the hood floor has a form like a circular sector with a central bay.

4. The dust extractor device as set forth in claim 1 wherein the extractor hood has at its top end region a surrounding neck part, with which the extractor hood is supported in a rotatable manner on the holder.

5. The dust extractor device as set forth in claim 1 wherein the holder is, in the mounted state thereof, arranged on the bottom side of the foot plate.

6. The dust extractor device as set forth in claim 1 wherein the connection means is able to be detachably secured to the foot plate.

7. The dust extractor device as set forth in claim 6 wherein the connection means is, in the position of use, arranged on the foot plate's top side.

8. The dust extractor device as set forth in claim 7 wherein the connection means is permanently or detachably joined with the covering means.

9. The dust extractor device as set forth in claim 1 wherein the connection means possesses a connection spigot.

10. The dust extractor device as set forth in claim 4, wherein the neck part is slotted.

11. The dust extractor device as set forth in claim 2, wherein the hood casing and the hood floor extend in the peripheral direction through an angle in a range between 140° and 150°.

\* \* \* \* \*